US005510727A

United States Patent [19]
Culmer et al.

[11] Patent Number: 5,510,727
[45] Date of Patent: Apr. 23, 1996

[54] OPTIMIZED ACTIVE SCSI TERMINATION TECHNIQUE

[75] Inventors: Daniel D. Culmer, San Jose; Mark R. Vituric, Santa Clara, both of Calif.

[73] Assignee: Micro Linear Corporation, San Jose, Calif.

[21] Appl. No.: 267,119

[22] Filed: Jun. 27, 1994

[51] Int. Cl.$^6$ ............................ H03K 17/16; H03K 3/01
[52] U.S. Cl. .............................. 326/30; 326/86; 326/90
[58] Field of Search ........................... 326/86, 87, 90, 326/30; 331/32; 375/35

[56] References Cited

U.S. PATENT DOCUMENTS

| | | | |
|---|---|---|---|
| 4,345,171 | 8/1982 | Harris, Jr. | 326/86 |
| 4,450,370 | 5/1984 | Davis | 326/86 |
| 4,943,739 | 7/1990 | Slaughter | 326/30 |
| 5,136,187 | 8/1992 | Ceccherelli et al. | 326/30 |
| 5,166,957 | 11/1992 | Lenoir | 326/30 |
| 5,338,979 | 8/1994 | Mammano et al. | 326/30 |

OTHER PUBLICATIONS

IBM Technical Disclosure Bulletin, "3–Mode Small Computer System Interface Terminator", vol. 37, No. 11, Nov. 1994.

Texas Instruments Inc., "TL2218–285 Excalibur SCSI Terminator," Advance Information Document, Draft #3, Jun. 16, 1992.

Ram Gopalan, Mark Vitunic, "An Optimized Active SCSI Termination Technique," Silicon Valley Personal Computer Design Conference, Jul. 20–22, 1993, vol. II, pp. 339–344.

*Primary Examiner*—Edward P. Westin
*Assistant Examiner*—Richard Roseen
*Attorney, Agent, or Firm*—Haverstock & Associates

[57] ABSTRACT

The invention employs an active element, a p-channel MOSFET, between a regulated voltage and a SCSI terminating line. An "ideal" current source terminator is most effective when a signal line is negated (low-to-high transition), whereas a resistive terminator is most effective when a signal line is asserted (high-to-low transition). The I-V characteristics of a p-channel MOSFET, wherein the relationship between the termination voltage and the termination current is characterized by a nonlinear and smooth voltage versus current curve, provide an optimized transient response for signal negations and signal assertions on a SCSI bus.

8 Claims, 3 Drawing Sheets

Block Diagram of the Preferred Embodiment
of the Active SCSI Termination Circuit Terminator I-V Characteristics Block Diagram of the Preferred Embodiment
of the Active SCSI Termination Circuit Circuit Diagram of an Optimized Active SCSI Termination Technique

OPTIMIZED ACTIVE SCSI TERMINATION TECHNIQUE

FIELD OF THE INVENTION

This invention relates to terminating signal lines. More specifically, this invention relates to active, nonlinear circuits for terminating signals on a SCSI bus.

BACKGROUND OF THE INVENTION

Passive termination methods for SCSI (Small Computer Systems Interface) have traditionally provided reliable operation at low data transfer rates. At higher data rates, however, transmission line effects become troublesome and passive terminators do not adequately compensate for impedance mismatches. Voltage reflections due to impedance mismatch between the terminator and the line are detrimental to the overall noise immunity of the system and become evermore troublesome the faster data rates become. Also, since signal line and other parasitic capacitances become more significant at higher data rates, a passive terminator is ineffective at reducing the overall rise time of a signal negation since it cannot source sufficient current.

Further drawbacks of the passive terminator deal with low noise immunity and excessive power dissipation. Since the passive terminator Thévenin voltage is unregulated the passive terminator achieves a low noise immunity which impinges upon the terminator output specifications called out by the SCSI standard. Finally, the passive terminator continuously dissipates wasted power since there always exists a DC path from the bias supply to ground.

The Boulay terminator utilizes an active voltage regulator to maintain a constant voltage at one terminal of a 110 Ω resistor (the other terminal couples to the line). Because the Thévenin voltage is regulated, the output current is essentially immune to bias supply variations. Consequently, increased noise immunity is achieved as compared to the passive terminator. The average power dissipation of the Boulay terminator is also reduced since the only power dissipated in the Boulay terminator is the current required to power the regulator.

Although the Boulay terminator improves the noise immunity and power dissipation attributable to the terminator it does not address the timing issues associated with the finite rise time of a signal negation resulting from line and parasitic capacitances. If the rise time is long compared to the clock rate and there exists ringing on the transient edge because of impedance mismatches, erroneous sampling may result. A circuit for providing a higher source current is needed to drive the line from low to high faster while reducing ringing during such transitions.

SUMMARY OF THE INVENTION

The present invention is directed toward an active SCSI termination circuit. The termination circuit provides a V-I characteristic as shown in FIG. 1 wherein the relationship between the termination voltage and the termination current is characterized by a nonlinear and smooth voltage versus current curve.

Simulations suggest that Boulay I-V characteristics are desired for signal line assertions (high-to-low transitions) and "ideal" current source I-V characteristics are desired for signal line negations (low-to-high transitions). This implies that the optimum terminator falls somewhere in between these two limits (see FIG. 1). Using a MOSFET as an active element (replacing the 110 Ω resistor of the Boulay-type terminator), together with feedback architecture of an amplifier, customizable I-V characteristics can be designed.

In FIG. 1 a resistive termination is shown as by a linear I-V curve 100. The duration of signal assertions (high-to-low transitions) can be reduced by providing a biasing voltage to one terminal of the resistive terminator. A Boulay terminator is well known in the art. The linear I-V curve 102 for a Boulay terminator is shown in FIG. 1. As described above, a Boulay terminator does not provide a good response for signal negations. Indeed, the I-V characteristics of a current source 104 are preferred for signal negations. Unfortunately, a current source introduces other performance problems for signal assertions. As a compromise, the present invention provides an active termination circuit having a smooth nonlinear I-V characteristic 106 which falls between the linear I-V characteristic 102 of a Boulay terminator and the linear I-V characteristic 104 of a current source.

Compared to the Boulay terminator, the preferred embodiment of this patent employs an active element between the voltage regulator output and the SCSI terminating line (i.e., instead of the 110 Ω series resistor as used in the Boulay terminator). The nonlinear I-V characteristic 106 of the active terminator of the present invention provides more current for each voltage point on the curve during a transition than does the Boulay terminator. The I-V curve 106 for the present invention is a smooth curve wherein the current provided for the maximum and minimum of the voltage swing approximates the Boulay current and has the largest difference in current during the middle of the transition. The present invention allows for faster rise time transients on a signal negation since the line can be driven from low to high faster than if allowed to just float up through a passive terminator. Though a Boulay terminator is preferred for signal assertions, so that reflections due to the impedance mismatch between the line and the terminator can be minimized, an unmatched compromise is justified because of the marked improvement in the edge transient of signal negation waveforms. The compromise is further justified since the degradation in signal assertion transients can be partially offset with the use of appropriately designed negative clamping circuits.

DETAILED DESCRIPTION OF THE PREFERRED EMBODIMENT

Figure 1:
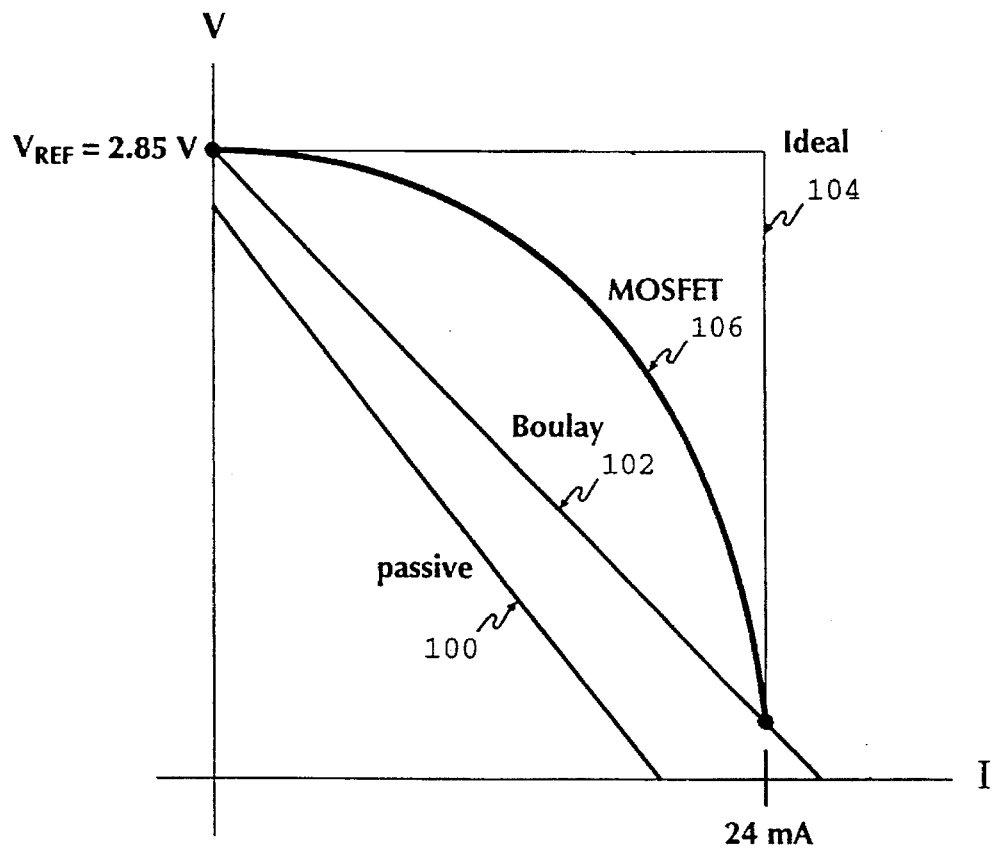
FIG. 1 is a depiction of the I-V characteristics of the passive Boulay, "ideal" current source and MOSFET type termination schemes.
Figure 2:
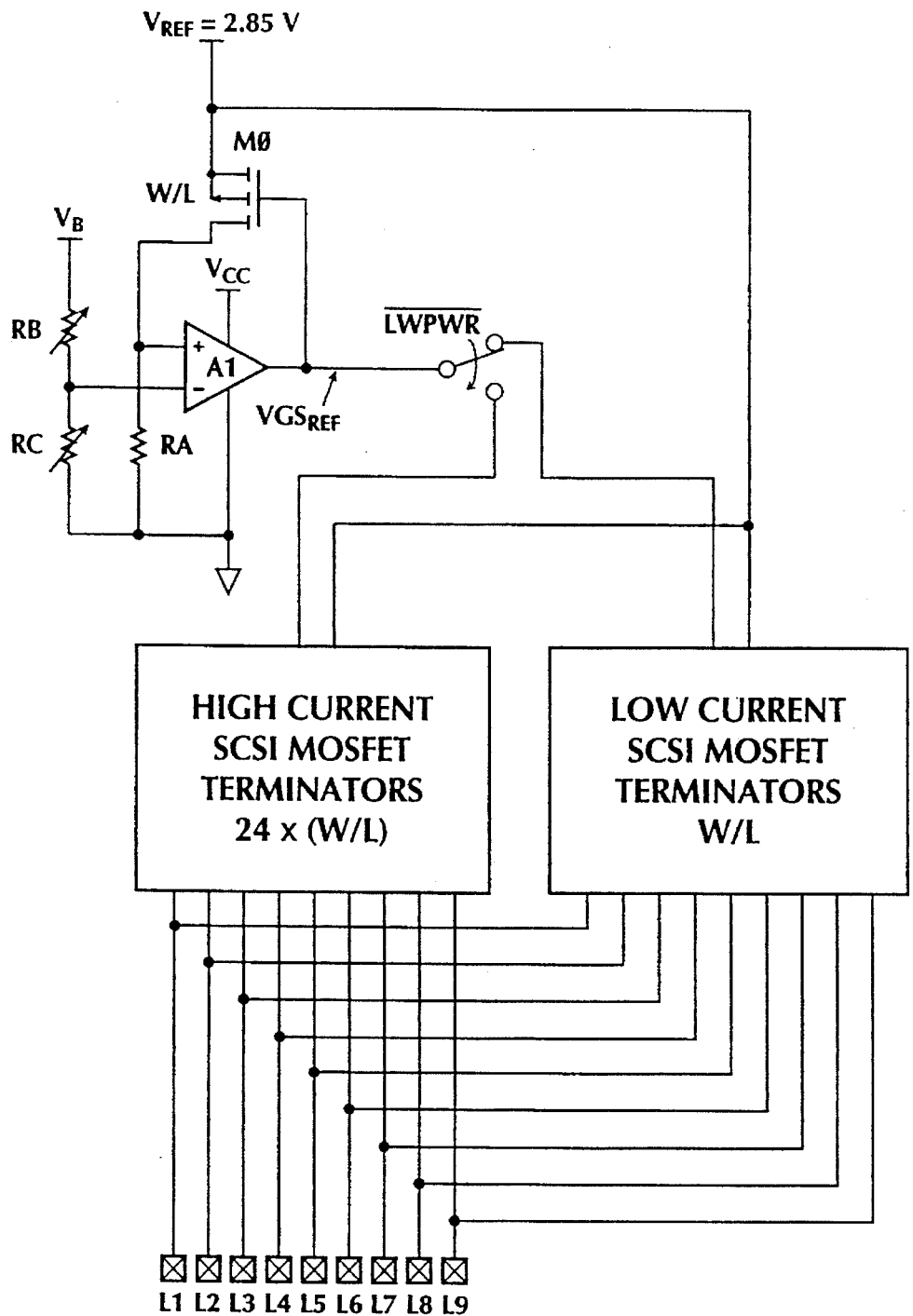
FIG. 2 is a block diagram of the preferred embodiment of the present invention.

FIG. 2 represents a block diagram of the preferred embodiment of the present invention. The MOSFET-based terminators each connect to an open collector driver (not shown in FIG. 2). The I-V characteristics of the preferred embodiment (FIG. 1) can be achieved either by trimming RA to adjust the closed-loop gain of the amplifier, A1, while supplying a constant voltage reference to the inverting terminal of the amplifier, A1; or, alternatively, the closed-loop gain of the amplifier A1 can be manufactured as a constant while RB or RC is trimmed to set the desired reference voltage at the inverting terminal of A1. The second method is the situation as illustrated in FIG. 2.

The preferred embodiment uses feedback architecture to set and control the gate-source bias voltage of the MOSFET terminators. Referring to FIG. 2, the operational characteristics of the MOSFET terminators are controlled by a MOSFET, M0, situated in the feedback loop of the amplifier. The amplifier inputs and the aspect ratio (W/L) of M0 are designed so that VGSREF biases M0 at a current of ID(M0)=1 mA. Because the gates of the MOSFET terminators are coupled to the gate of M0, the currents of the MOSFET terminators are related to ID(M0) through the multiplication factor of the aspect ratios of M0 and the MOSFET terminators. Varying the W/L aspect ratio while maintaining a constant multiplication factor affects the "bow" of the I-V characteristics of the MOSFET terminators. Therefore, the W/L aspect ratio can be designed to obtain a desired terminating characteristic for a particular application.

The present invention also utilizes control logic which allows the user to select a lower power SCSI termination for low-power peripheral applications. The low-power terminators are useful for power conscious, portable system and peripheral applications where the cable lengths are small. In such applications fast signal transitions can be obtained while consuming very little power.

Figure 3:
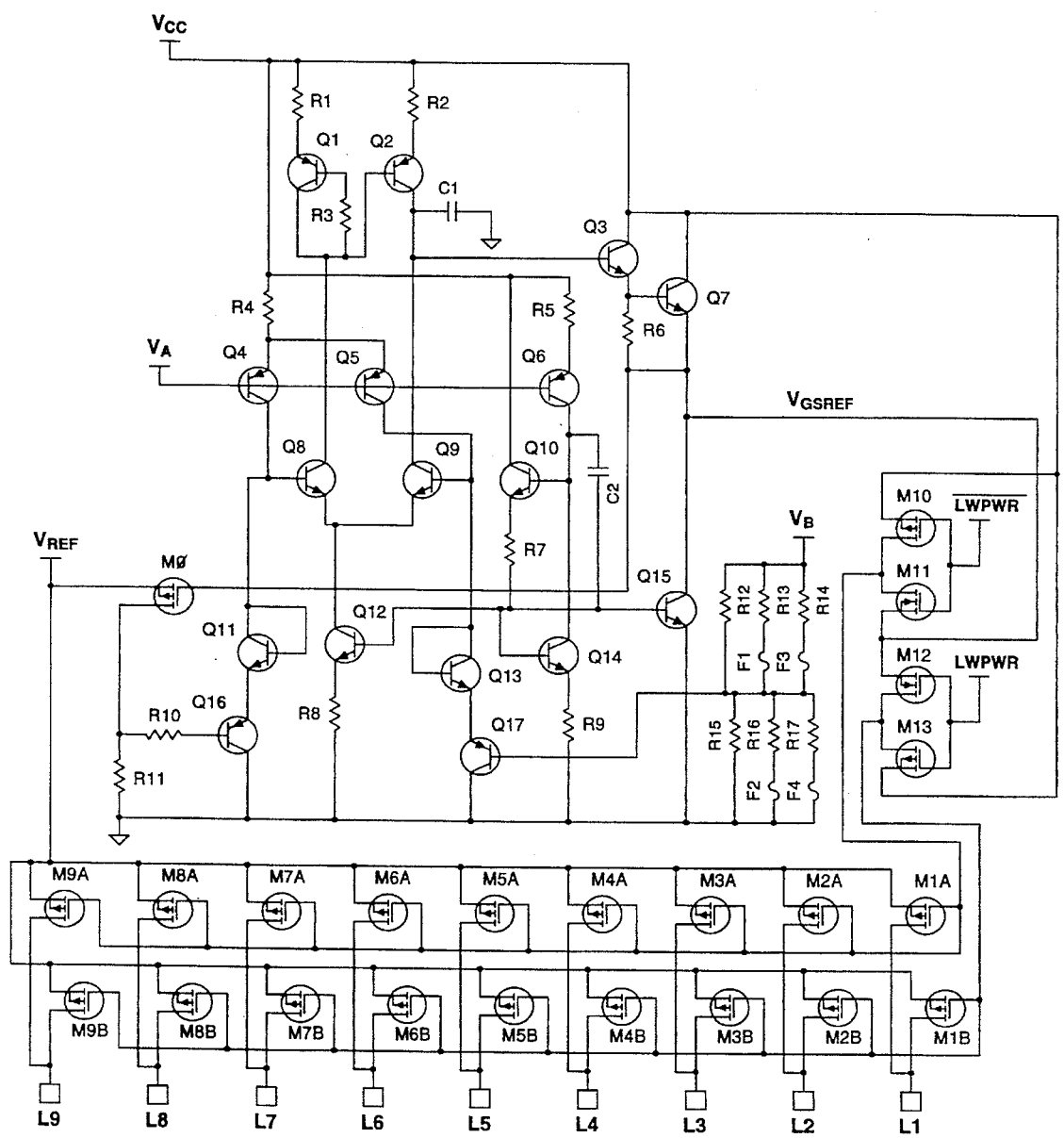
FIG. 3 is a circuit diagram of the present invention.

FIG. 3 shows a schematic diagram of the preferred embodiment of the present invention. The circuit includes a power supply node, VCC, a circuit ground, an input for a regulated voltage source, VREF, a constant voltage reference input, VB to set a DC bias voltage, and a current source biasing voltage, VA, generated by means well known in the art.

The first terminal of a resistor, R12, is coupled to VB; the first terminal of a resistor, R13, is coupled to VB; and the first terminal of a resistor, R14, is coupled to VB. The second terminal of R13 is coupled to the first terminal of a polysilicon fuse, F1, and the second terminal of R14 is coupled to the first terminal of a polysilicon fuse, F3. The second terminals of each of F1 and F3 are coupled to the second terminal of R12.

The second terminal of R12 is coupled to the first terminal of a resistor, R15, the first terminal of a resistor, R16, and the first terminal of a resistor, R17. The second terminal of R15 is coupled to ground. The second terminal of R16 is coupled to the first terminal of a polysilicon fuse, F2, and the second terminal of R17 is coupled to the first terminal of a polysilicon fuse, F4. The second terminals of each of F2 and F4 are coupled to ground.

Q17 is a pnp bipolar transistor having an emitter, a collector and a base. The base of Q17 is coupled to the second terminal of R12. The collector of Q17 is coupled to ground.

Q13 is an npn bipolar transistor having an emitter, a collector and a base. The emitter of Q13 is coupled to the emitter of Q17. The base of Q13 is coupled to the collector of Q13.

Q8, Q9, Q11 and Q12 are npn bipolar transistors each having an emitter, a collector and a base. The base of Q9 is coupled to the collector of Q13. The emitter of Q9 is coupled to the emitter of Q8 and to the collector of Q12. The base of Q8 is coupled to the collector of Q11. The collector of Q11 is coupled to the base of Q11. The emitter of Q12 is coupled to the first terminal of a resistor, R8. The second terminal of R8 is coupled to ground.

Q16 is a pnp bipolar transistor having an emitter, a collector and a base. The emitter of Q16 is coupled to the emitter of Q11. The collector of Q16 is coupled to ground.

M0 is a p-channel MOSFET having a source, a drain, and a gate. The source of M0 is coupled to VREF. The drain of M0 is coupled to the first terminal of a resistor, R10 and the first terminal of a resistor, R11. The second terminal of R11 is coupled to ground and the second terminal of R10 is coupled to the base of Q16.

Q4, Q5 and Q6 are pnp bipolar transistors each having an emitter, a collector and a base. The collector of Q4 is coupled to the base of Q8 and the collector of Q11. The emitter of Q4 is coupled to the first terminal of a resistor, R4. The second terminal of R4 is coupled to VCC and to the emitter of Q5. The collector of Q5 is coupled to the base of Q9. The first terminal of a resistor, R5, is coupled to VCC. The second terminal of R5 is coupled to the emitter of Q6. The bases of each of Q4, Q5 and Q6 are coupled to VA.

Q10 and Q14 are npn bipolar transistors each having an emitter, a collector and a base. The collector of Q10 is coupled to VCC. The base of Q10 is coupled to the collector of Q6, the collector of Q14 and to the first terminal of a capacitor, C2. The second terminal of C2 is coupled to the base of Q12. The emitter of Q10 is coupled to the first terminal of a resistor, R7. The second terminal of R7 is coupled to the bases of Q12 and Q14. The emitter of Q14 is coupled to the first terminal of a resistor, R9. The second terminal of R9 is coupled to ground.

Q1 and Q2 are pnp bipolar transistors each having an emitter, a collector and a base. The emitter of Q1 is coupled to the first terminal of a resistor, R1. The second terminal of R1 is coupled to VCC. The base of Q1 is coupled to the first terminal of a resistor, R3. The second terminal of R3 is coupled to the collector of Q8, the base of Q2 and the collector of Q1. The emitter of Q2 is coupled to the first terminal of a resistor, R2. The second terminal of R2 is coupled to VCC. The collector of Q2 is coupled to the first terminal of a capacitor, C1, and the collector of Q9. The second terminal of C1 is coupled to ground.

Q3 is an npn bipolar transistor having an emitter, a collector and a base. The collector of Q2 is coupled to the base of Q3. The collector of Q3 is coupled to VCC.

Q7 and Q15 are npn bipolar transistors each having an emitter, a collector and a base. The emitter of Q3 is coupled to the base of Q7 and to the first terminal of a resistor, R6. The collector of Q7 is coupled to VCC. The second terminal of R6 is coupled to the emitter of Q7 and the gate of M0. The collector of Q15 is coupled to the emitter of Q7. The emitter of Q15 is coupled to ground. The base of Q15 is coupled to the second terminal of C2.

M11 and M12 are n-channel MOSFETs each having a source, a drain and a gate. M10 and M13 are p-channel MOSFETs each having a source, a drain and a gate. The collector of Q15 is coupled to the source of M11 and to the source of M12. The gate of M11 is coupled to $\overline{\text{LWPWR}}$ and the gate of M10. The gate of M12 is coupled to LWPWR and the gate of M13. The sources of M10 and M13 are coupled to VCC.

M1A, M2A, M3A, M4A, M5A, M6A, M7A, M8A, and M9A are p-channel MOSFETs each having a source, a drain and a gate and each with an aspect ratio designed to be twenty-four times larger than that of the aspect ratio of M0. The drains of each of M10 and M11 are coupled to each gate of M1A, M2A, M3A, M4A, M5A, M6A, M7A, M8A, and M9A. The sources of each of M1A, M2A, M3A, M4A, M5A, M6A, M7A, M8A, and M9A are coupled to VREF.

M1B, M2B, M3B, M4B, M5B, M6B, M7B, M8B, and M9B are p-channel MOSFETs each having a source, a drain and a gate and each with an aspect ratio designed to be equal to that of the aspect ratio of M0. The drains of each of M12 and M13 are coupled to each gate of M1B, M2B, M3B, M4B, M5B, M6B, M7B, M8B, and M9B. The sources of each of M1B, M2B, M3B, M4B, M5B, M6B, M7B, M8B, and M9B are coupled to VREF.

The drain of M1A is coupled to the drain of M1B. The drain of M2A is coupled to the drain of M2B. The drain of M3A is coupled to the drain of M3B. The drain of M4A is coupled to the drain of M4B. The drain of M5A is coupled to the drain of M5B. The drain of M6A is coupled to the drain of M6B. The drain of M7A is coupled to the drain of M7B. The drain of M8A is coupled to the drain of M8B. The drain of M9A is coupled to the drain of M9B.

FIG. 3 is related to the block diagram in FIG. 2 as follows. Bipolar transistors Q1 through Q17, resistors R1 through R9 and capacitors C1 and C2 are elements which comprise the amplifier, A1 of FIG. 2. Resistors R10 through R17 of FIG. 3 are components for biasing the amplifier A1 of FIG. 2, and are representative of RA, RB, and RC in FIG. 2. M0 in FIG. 3 represents the same M0 in FIG. 2. F1 through F4 are polysilicon fuses which together with VB, set the bias point at the inverting terminal of amplifier A1 depending on whether or not a particular fuse has been opened. P-channel MOSFETs M10 and M13 and n-channel MOSFETs M11 and M12 of FIG. 3 comprise the control circuit (represented as a switch in FIG. 2) which selects either the high-current SCSI MOSFET terminators (M1A through M9A) or the low-current SCSI MOSFET terminators (M1B through M9B), depending on whether LWPWR is high or low. L1 through L9 are the coupling terminals which couple the SCSI terminator circuit to the SCSI bus.

Note that the invention is not limited to nine SCSI terminators per circuit as described herein and as illustrated in the preferred embodiment of FIG. 2. The invention can be expanded to supply as many SCSI terminators as VREF can source. The design of VREF can be modified using well known techniques to accommodate the current requirements of additional SCSI terminators.

Operational Characteristics of the Preferred Embodiment

Referring to FIGS. 2 and 3, when a signal line, i.e., one of L1 through L9, is negated (driver turns off), the particular MOSFET terminator (one of M1A through M9A or M1B through M9B) associated with the negated line, pulls that line up to VREF=2.85 V. When a signal line is asserted (driver turns on), the corresponding terminating MOSFET turns on and the feedback amplifier, A1, forces the drain current of the MOSFET terminator to a scaled version of the drain current through the reference MOSFET, M0. The currents are related since the gate of M0 is coupled to the gates of the terminating MOSFETs and the sources of both the terminating MOSFETs and M0 are all held at VREF= 2.85 V. Because of this biasing arrangement, the scaling factor is equal to the multiplication factor (i.e. the factor by which the aspect ratio of M0 is multiplied in order to equal the aspect ratio of the terminating MOSFETs), and thus determines the current through a terminating MOSFET when its associated line is asserted.

In FIG. 2, if $\overline{\text{LWPWR}}$ is low then the low-current SCSI terminators (M1B through M9B) are selected and the drain current through a terminator of an asserted line is equal to the drain current through M0 since the multiplication factor is 1. When $\overline{\text{LWPWR}}$ is high the high-current SCSI terminators (M1A through M9A) are selected and the drain current through a terminator of an asserted line is twenty-four times larger than the drain current through M0 since the multiplication factor is twenty-four.

The shape of the active terminator I-V characteristics can be customized since it is controlled by the absolute W/L aspect ratio of M0 and the termination MOSFETs with a constant multiplication factor. For example, larger MOSFET terminator aspect ratios, for both M0 and the termination MOSFETs improve signal negations since the MOSFET terminator acts more like an "ideal" current source than it does a passive load due to the enhanced ability of the MOSFET element to source current upon demand.

We claim:

1. An active SCSI termination circuit comprising:
   a. a first means for terminating a signal line on a SCSI bus, comprising a first p-channel MOSFET, having a source, a gate, a drain, and an aspect ratio approximately twenty-four times larger than an aspect ratio of a reference MOSFET having a gate, a source and a drain and the drain of the p-channel MOSFET coupled to the signal line;
   b. a second means for terminating the signal line, comprising a second p-channel MOSFET, having a source, a gate, a drain, and an aspect ratio approximately equal to the aspect ratio of the reference MOSFET and the drain of the second p-channel MOSFET coupled to the signal line; and
   c. means for selecting between the first p-channel MOSFET and the second p-channel MOSFET.

2. The active SCSI termination circuit according to claim 1 further comprising:
   a. an amplifier having an inverting input coupled to a first constant voltage source, a noninverting input coupled to a first terminal of a first variable resistor; and
   b. a feedback loop wherein the drain of the reference MOSFET is coupled to a second terminal of the first variable resistor, the source of the reference MOSFET is coupled to a second constant voltage source and the gate of the reference MOSFET is coupled to an output of the amplifier and to the gates of the particular p-channel MOSFET selected by the means for selecting.

3. The active SCSI termination circuit according to claim 1 further comprising:
   a. an amplifier having an inverting input coupled to a reference voltage, a noninverting input coupled to the first terminal of a second resistor;
   b. means for generating the reference voltage comprising a third variable resistor having a first terminal coupled to the inverting input of the amplifier and a second terminal coupled to a third constant voltage source, a fourth resistor having a first terminal coupled to the inverting input of the amplifier second terminal coupled to ground, whereby a Thevenin voltage is formed at the first terminals of said third variable resistor and fourth resistor; and
   c. a feedback loop wherein the drain of the reference MOSFET is coupled to a second terminal of the second resistor, the source of the reference MOSFET is coupled to a second constant voltage source and the gate of the reference MOSFET is coupled to an output of the amplifier and to the gates of the particular p-channel MOSFET selected by the means for selecting.

4. An active SCSI termination circuit comprising:
   a. a first means for terminating a plurality of signal lines on a SCSI bus, comprising a first plurality of p-channel MOSFETs, each p-channel MOSFET of the first plurality having a source, a gate, a drain, and an aspect ratio approximately twenty-four times larger than an aspect ratio of a reference MOSFET having a gate, a source and a drain and the drain of each p-channel MOSFET of the first plurality coupled to one of the plurality of signal lines;

b. a second means for terminating the plurality of signal lines, comprising a second plurality of p-channel MOSFETs, each p-channel MOSFET of the second plurality having a source, a gate, a drain, and an aspect ratio approximately equal to the aspect ratio of the reference MOSFET and the drain of each p-channel MOSFET of the second plurality coupled to one of the plurality of signal lines; and c. means for selecting between the first plurality of p-channel MOSFETs and the second plurality of p-channel MOSFETs.

5. The active SCSI termination circuit according to claim 4 further comprising:

a. an amplifier having an inverting input coupled to a first constant voltage source, a noninverting input coupled to a first terminal of a first variable resistor; and b. a feedback loop wherein the drain of the reference MOSFET is coupled to a second terminal of the first variable resistor, the source of the reference MOSFET is coupled to a second constant voltage source and the gate of the reference MOSFET is coupled to an output of the amplifier and to the gates of the particular plurality of p-channel MOSFETs selected by the means for selecting.

6. The active SCSI termination circuit according to claim 4 further comprising:

a. an amplifier having an inverting input coupled to a reference voltage, a noninverting input coupled to a first terminal of a second resistor;

b. means for generating the reference voltage comprising a third variable resistor having a first terminal coupled to the inverting input of the amplifier and a second terminal coupled to a third constant voltage source, a fourth resistor having a first terminal coupled to the inverting input of the amplifier second terminal coupled to ground, whereby a Thévenin voltage is formed at the first terminals of said third variable resistor and fourth resistor; and c. a feedback loop wherein the drain of the reference MOSFET is coupled to a second terminal of the second resistor, the source of the reference MOSFET is coupled to a second constant voltage source and the gate of the reference MOSFET is coupled to an output of the amplifier and to the gates of the particular plurality of p-channel MOSFETs selected by the means for selecting.

7. An active SCSI termination circuit coupled with means for receiving a signal from a peripheral device via a signal line, the termination circuit with means for passing a maximum termination current and dropping a minimum termination voltage when the signal line is asserted and the termination circuit with means for pulling the signal line to a maximum termination voltage and passing a minimum termination current when the signal line is negated; wherein the relationship between the termination voltage and the termination current is characterized by a nonlinear and smooth voltage versus current curve plotted in the first quadrant of a Cartesian coordinate system and having a negative slope varying continuously from a first point having a first slope to a second point having a second slope wherein the coordinates of the first point comprise the maximum termination voltage and the minimum termination current and wherein the coordinates of the second point comprise the minimum termination voltage and the maximum termination current, such that the negative slope becomes increasingly and continuously more negative as the termination voltage increases from the first point to the second point.

8. An active SCSI termination circuit having a voltage versus current curve according to claim 7 further comprising a maximum value of the first slope at the first point and a minimum value of the first slope at the first point, a maximum value of the second slope at the second point and a minimum value of the second slope at the second point such that:

a. the maximum value of the first slope at the first point is nearly zero;

b. the minimum value of the first slope at the first point is equal to the ratio of the minimum termination current minus the maximum termination current to the maximum termination voltage minus the minimum termination voltage;

c. the maximum value of the second slope at the second point is equal to the minimum value of the first slope at the first point; and d. the minimum value of the second slope at the second point approaches infinity.

\* \* \* \* \*